United States Patent [19]

Marinaro

[11] Patent Number: 5,327,466

[45] Date of Patent: Jul. 5, 1994

[54] 1X ASYNCHRONOUS DATA SAMPLING CLOCK

[76] Inventor: Frank Marinaro, 22 Lauren Ave., Dix Hills, N.Y. 11746

[21] Appl. No.: 750,968

[22] Filed: Aug. 28, 1991

[51] Int. Cl.$^5$ .............................................. H04L 7/04
[52] U.S. Cl. .................................... 375/106; 375/118; 370/108; 307/480; 307/269; 328/63
[58] Field of Search ............... 375/106, 110, 114, 116, 375/118, 95; 370/100.1, 108; 328/63, 72; 340/825.2; 307/480, 269

[56] References Cited

U.S. PATENT DOCUMENTS 4,604,582 8/1986 Strenkowski et al. ............... 370/108

FOREIGN PATENT DOCUMENTS 0440187 8/1991 European Pat. Off. .

Primary Examiner—Stephen Chin
Assistant Examiner—Young Tse
Attorney, Agent, or Firm—Dilworth & Barrese

[57] ABSTRACT

A circuit for retiming asynchronous data. A sampling clock is derived in which the system clock frequencies are no higher than that of the data frequency. The leading edge of the signal from a received data-to-clock position circuit and a bias distortion circuit are combined and decoded to determine the center of the received data to select the proper sampling clock for the received data.

19 Claims, 3 Drawing Sheets

1X ASYNCHRONOUS DATA SAMPLING CLOCK

BACKGROUND OF THE INVENTION

1. Field of the Invention

The present invention relates to a means of retiming asynchronous data requiring system clock frequencies no higher than that of the data frequency. This invention is intended for use in local area networks or wherever it is necessary to sample and retime asynchronous data.

2. Discussion of the Prior Art

Local area networks which permit digital data communications between personal computers, printers and similar data stations, are commonly used in offices, factories and other locations. These networks allow digital data communications, typically over coaxial cable or twisted pairs of transmission lines, between different computers and associated peripheral work stations at spaced locations within the office or factory facility.

The two most popular methods of transmitting and receiving data in local area networks in use today are the asynchronous method and the synchronous method. The most common asynchronous method is known as the Universal Asynchronous Receiver/Transmitter circuit (UART), while the most popular synchronous method utilizes Manchester Encoded transmitted data and Phase-Lock Loop (PLL) circuits. A disadvantage associated with these two methods is their limitations at high frequency data rates.

A UART circuit converts data from a parallel format to a serial format for transmission over a communications line. The UART requires clock frequencies of sixteen times that of the data rate. The method used by the UART to sample the Received Data (RD) using clock frequencies 16 times higher than the data bit rate is this: when the RD changes from a Mark to a Space (a Mark being a high and a Space being a low), a spike detection circuit in the UART counts eight clocks of the 16× clocks (one-half a bit time), then samples the data again to determine if the line is still in the low state. If the RD is still low the bit is considered a valid Start bit. This condition enables a counter in the UART which divides the 16× clock by 16 to produce a sampling clock at the center of each bit time.

The received data bits, the Mark and Space, are also known as Stop and Start bits respectively. A data word consists of one Start bit, five to eight character bits, one parity bit and one, or one and a half, Stop Bits. The UART is seldom used at frequencies above 1 MHZ which is due to the high frequency system clock requirement of the 16× clocks. A UART designed with this philosophy would require a 16× clock frequency of 320 MHZ to transfer data at a 20 MHZ data rate.

The synchronous method, on the other hand, requires a forced mid-bit transition to convey the inherent timing information of the data. In the synchronous method, the clock defines the transmission time for the data, such that the frequency of the data to be equal to that of the transmitter clock. Start and Stop bits for each character are not needed in the synchronous system, providing greater transmission band width for message bits.

SUMMARY OF THE INVENTION

The transmission of data in any type of a local area network presents the problem of how to sample and retrieve that transmitted data. The present invention provides a novel replacement for the 16× clock circuit of a UART and utilizes the leading edge of the incoming data to latch the position of a multitapped delay line, together with received data bias distortion circuitry, to select the proper data sampling clock. This invention eliminates the need for system clock frequencies of 16× (sixteen times) that of the received data (RD) frequency.

BRIEF DESCRIPTION OF THE DRAWINGS

The features of the present invention may be better understood and further advantages and uses thereof more readily apparent, when considered in view of the following detailed description of the preferred embodiments, taken with the accompanying drawings in which.

THEORY OF OPERATION

Figure 1:
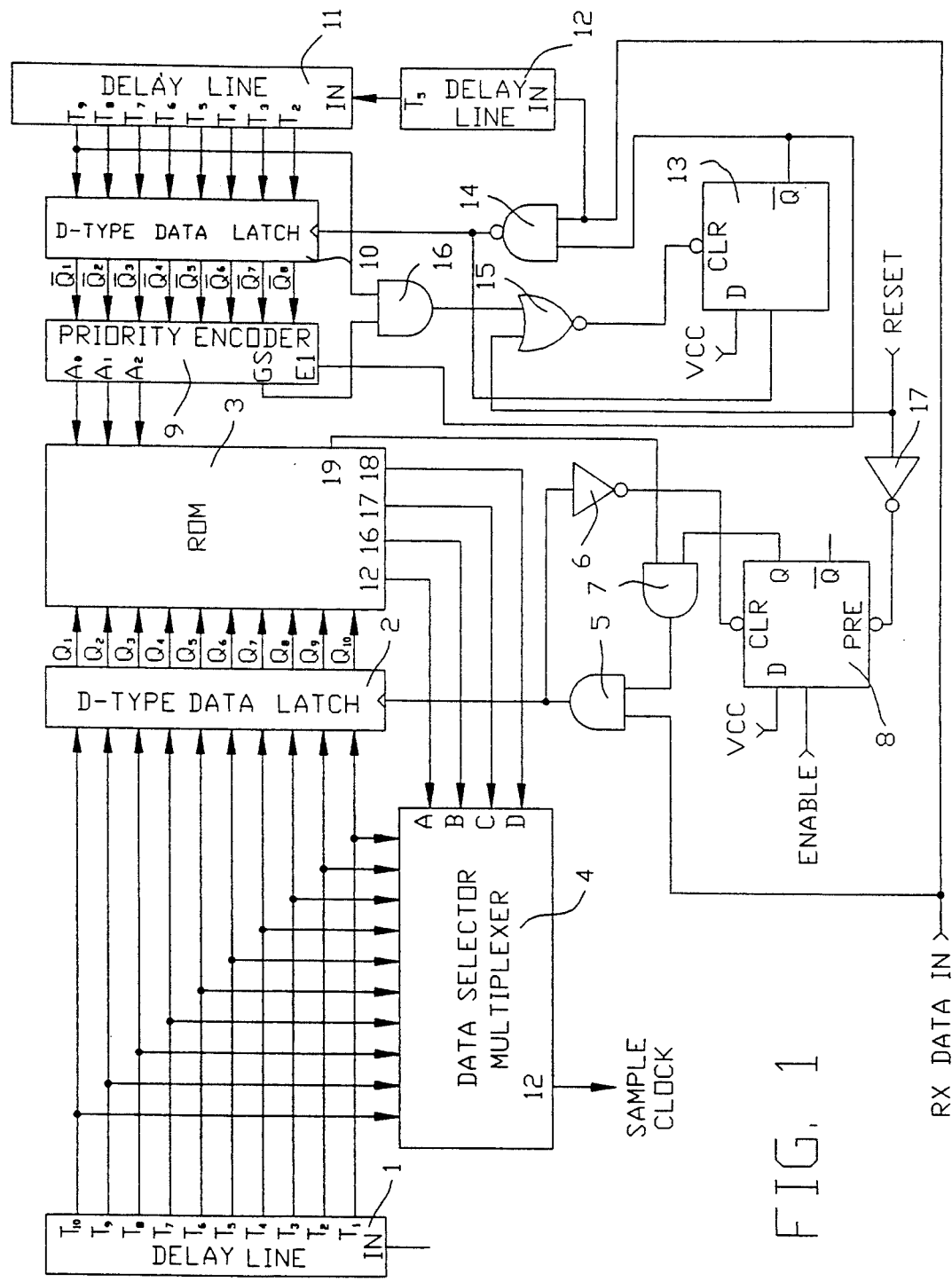
FIG. 1 is a schematic diagram of the invention.

The present invention is based on the theory that two perfect oscillators operating at exactly the same frequency will maintain the same phase relationship to each other forever. Since it is not possible to design a perfect oscillator, for purposes of discussion, two oscillators operating at approximately the same frequency with an error of + or −0.01% shall be considered. By knowing the maximum error between the two oscillator frequencies, it is possible to calculate the maximum clock edge drift with respect to one another for a given time period.

Considering two 20 MHZ oscillators that each have a frequency tolerance of + or −0.01%, the worst case frequency difference between the two oscillators would be for one oscillator to be at the maximum frequency of 20,020,000 HZ and the other to be at the minimum frequency of 19,980,000 HZ. To find the period difference it is necessary to first solve the period time.

$$T = 1/f, \text{ where } T = \text{time and } f = \text{frequency}$$
$$T = 1/f = (1/19,980,000) = 50.050 \text{ nano seconds}$$
$$(1/20,020,000) = \underline{49.950} \text{ nano seconds}$$
$$100 \text{ pico seconds}$$

The clock period error in such a scenario is equal to 100 pico seconds, which means the leading edge of the two clocks would drift 100 pico seconds with respect to each other for every clock period. One 20 MHZ clock period is equal to 50 nano seconds. Dividing the period by the error (50 nsec/0.1 nsec=500), reveals that the two clocks will be coincident once for every 500 clock times.

As a second example, two 20 MHZ oscillators with a frequency error of + or −0.005% will have a frequency difference of 20,010,000 HZ for the maximum frequency and 19,990,000 HZ for the minimum frequency. To find error in time, $$T = 1/f = (1/19,990,000) = 50.025 \text{ nano seconds}$$
$$(1/20,010,000) = \underline{49.975} \text{ nano seconds}$$
$$50 \text{ pico seconds}$$

The clock period error between the two oscillators would be 50 pico seconds, and dividing the period by the error (50 ns/0.05 ns=1,000), for the same 50 nano second clock period the two oscillators will be coincident once every 1,000 clock times.

Figure 2:
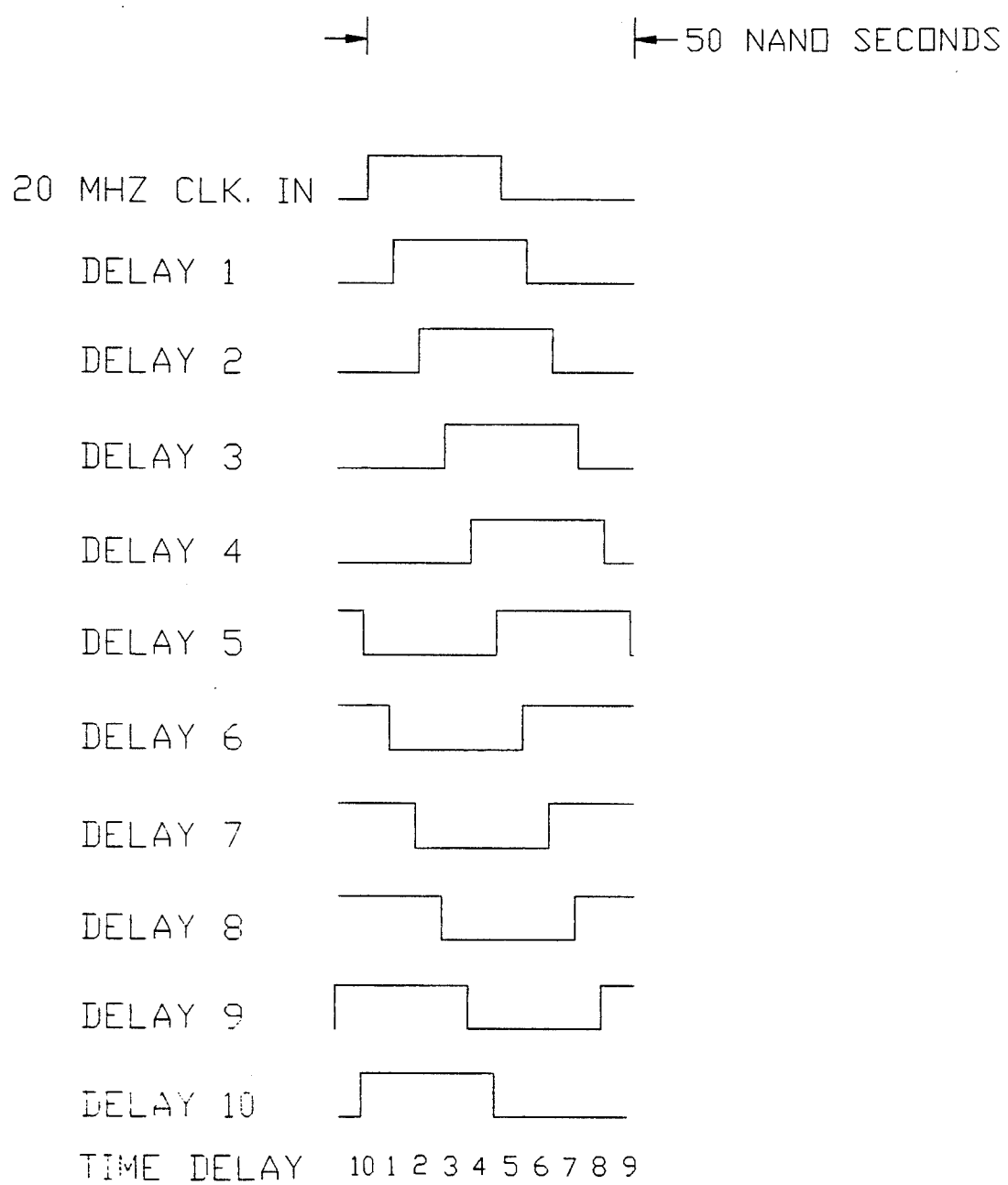
FIG. 2 is an illustration of the outputs of a ten lap 50 nano second delay line, with each tap delayed 5 nano seconds from the preceding tap.

Consider a 20 MHZ clock as the input to a 50 nano second ten tap delay line. Each tap is delayed 5 nano seconds from the preceding tap. Since the total delay of the delay line is equal to one full 20 MHZ clock time, the resulting outputs would provide a clock edge every 5 nano seconds during the clock period to chose from. Turning to the drawings FIG. 2 is a diagram of this 50 nano second delay line output timing. If the outputs of this delay line were connected to the inputs of a D-Type data latch, which outputs at 1 times the input valve, and this D-Type data latch was clocked, the position of each delayed output at the time that clock edge occurred would be latched. If this data latch clock were the leading edge of the received data (RD) the position of each delayed clock at the time that leading edge of RD occurred could be determined. If the delay line outputs were also connected to the data inputs of a data selector multiplexer, the clocks could then be selected that are phase shifted from the input clock in 36 degree increments, or every 5 nano seconds.

As previously mentioned, prior art UART circuits synchronize to the leading edge of the RD and sample the RD at the eight count of the divide by 16 clock, and at low frequencies this practice is acceptable. However, at a frequency of 20 MHZ, a 15 nano second error in the data pulse band width is equivalent to a 30% bias distortion, whereas at a frequency of 1 MHZ the same 15 nano seconds equals a bias distortion error of only 1.5%. With this in mind, one more item must be considered before an acceptable design of an asynchronous data sampling clock circuit for use at higher frequencies can be achieved, and that is the RD duty cycle or bias distortion.

When data is transmitted as a zero/one pattern it will appear as a 50% duty cycle at the transmitter end, however, it may not appear as a 50% duty cycle at the receiver end. This is due to the capacitance, inductance and resistance of the interconnecting cables, and is called bias distortion. For 20 MHZ data which has a 50 nano second bit time the allowable bias distortion is 30%, or 35 nano seconds for a minimum pulse width and 65 nano seconds for the maximum pulse width. This makes it necessary to incorporate a bias distortion sampling circuit in the RD (received data) sampling clock circuit design, to determine where the true center of the RD pulse is.

The present invention utilizes a delay line and a D-type data latch concept. In this case the RD (received data) signal is connected to the input of a 75 nano second 15 tap delay line, with each tap delayed 5 nano seconds from the preceding tap. When the input data changes from a zero to a one, this signal will propagate through the delay line. The trailing edge of this RD (received data) signal will become the clock to the D-Type data latch loading this D-Type data latch with the position of the received data in the delay line, which is how far the RD had propagated through the delay line at the time its trailing edge occurred. From this latch the received data pulse width can be determined.

If the outputs of the two data latches are decoded the RD pulse width information in one data latch and the clock to RD leading edge position information in the other data latch can be determined. This information can be used as the address inputs to a ROM that is programmed to output to the address inputs of the data selector multiplexer. This program can be designed to select the proper delayed clock, derived from the previously mentioned data selector multiplexer delayed clock data inputs that will coincide with the center of the incoming received data. The multiplexer output could then be used as the RD sampling clock.

Figure 3:
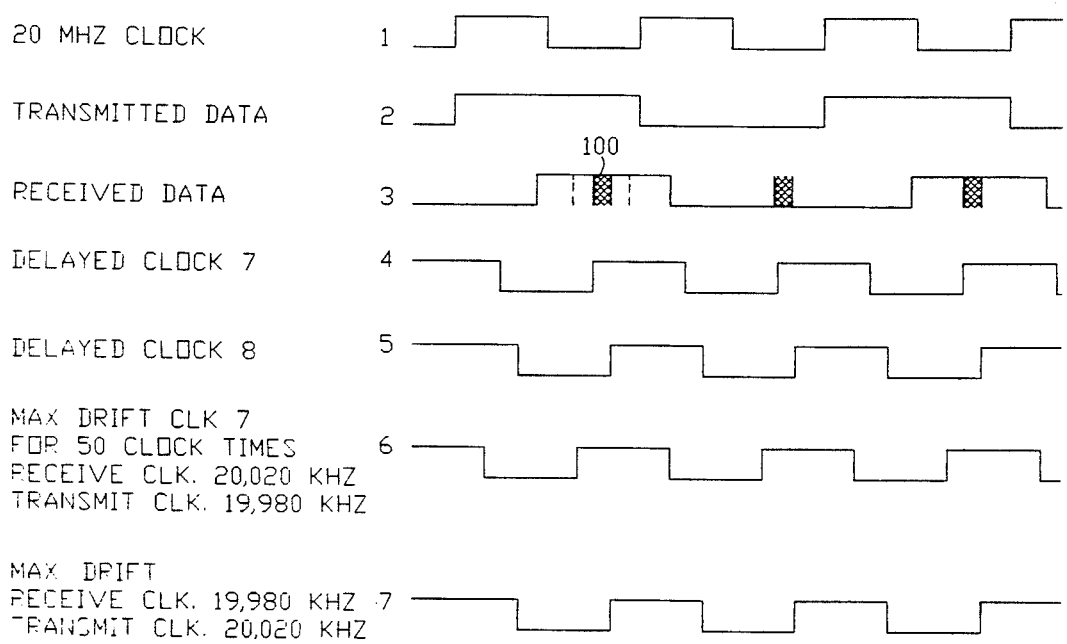
FIG. 3 is a diagram showing the safe data sampling window.

Referring now to FIG. 2 and FIG. 3, and ignoring any component internal delays, the sampling clock selection and the safe sampling window will now be described. FIG. 3 line 2 shows a one-zero-one data pattern having a 50% duty cycle as the transmitted data while line 3 of FIG. 3 is an illustration of the worse case RD duty cycle. Shaded portion 100 of this RD on line 3 of FIG. 3 represents the error that can be introduced by the delay line and D-Type latch circuit. Since the taps are spaced 5 nano seconds apart an error of 5 nano seconds is produced. Lines 4 and 5 of FIG. 3 are the two clocks that can be chosen to sample the RD for this particular illustration. Referring to FIG. 2 and FIG. 3, particularly lines 4 and 5 of FIG. 3, are the delayed clocks 7 and 8 of FIG. 2, respectively. Line 6 of FIG. 3 illustrates the position to which the clock on line 4 of FIG. 3 would drift in 50 clock cycles, if the transmit clock frequency is 19,980,000 HZ and the receiver clock frequency is 20,020,000 HZ. The illustration on line 7 of FIG. 3 shows the position to which the clock on line 4 would drift in 50 clock times if the transmit clock frequency is 20,020,000 HZ and the receiver clock frequency is 19,980,000 HZ.

Assuming total component internal delays of 12 nano seconds, the ROM would have been programmed to compensate for the component internal delays and would select delayed clock 5 of FIG. 2 as the RD (received data) sample clock.

DESCRIPTION OF THE PREFERRED EMBODIMENT

The description of the preferred embodiment of the present invention applies to a 20 MHZ data rate design; higher or lower frequency versions of the invention can be designed using this description as a guide. For this description the Stop bit will be considered to be a logic zero or low signal and the Start bit will be a logic one or high signal.

When the system is initially powered up and at the end of every data packet, a reset pulse of no less than 25 nano seconds is sent to the retiming circuit logic. Referring to FIG. 1 this reset pulse is connected to the input pin of the invertor 17 and input pin of the NOR gate 15. This reset pulse will cause the following chain of events to occur: When the reset pulse changes from a low to a high the input pin of NOR gate 15 will go high causing its output pin to go low. This low output on the output pin of NOR gate 15 is connected to the clear input pin of the D-Type Flip-Flop 13, causing its $\bar{Q}$ output pin to be a logic one. The $\bar{Q}$ output pin of Flip-Flop 13 is connected to the input pin E1 of the Priority Encoder 9. A logic one on the E1 input of encoder 9 will cause the A0, A1, A2 and GS outputs of encoder 9 to be disable (all outputs will appear as high or a logic one). The A0–A2 outputs of encoder 9 are connected to a Read Only Memory (ROM) 3. Whenever the A0–A2 outputs of encoder 9 are all high, ROM 3 is programmed to output a zero on pin 19. This zero at pin 19 of ROM 3 prevents the RD leading edge detect circuit from clocking the D-Type Data Latch 2 via AND gates 5 and 7 as shown. This is accomplished in the following manner. The input pin of AND gate 7 is connected to the output pin 19 of ROM 3 which as stated is low. The input pin of AND gate 7 will also be low, therefor the output pin of AND gate 7 must also be a logic zero. This output pin of AND gate 7 is connected to the input pin of AND gate 5, and this low input on the input pin of AND gate 5 will cause its output pin to be a logic zero, disabling AND gate 5.

The Reset pulse will also preset the D-Type Flip-Flop 8 in this manner: the input pin of invertor 17 will go high causing its output pin to go low. This low output on the output pin of invertor 17 is connected to the preset input pin of the D-Type Flip-Flop 8 and will preset this flip-flop causing the Q output pin of flip-flop 8 to be a logic one. This Q output pin of flip-flop 8 is connected to the input pin of AND gate 7.

The sampling clock circuit is now reset and in the search mode searching for the start of transmission on the RD line. The 20 MHZ system clock is connected to the input of delay line 1 as seen in FIG. 1, and it will propagate through the 50 nano second ten tap delay line 1. Each tap of this delay line 1 is delayed 5 nano seconds from the previous tap. When the RD signal has a low to high transition the RD will change from a logic zero to a logic one. The RD is connected to the input pin of the 25 nano second delay line 12, the input pin of AND gate 5 and the input pin of NAND gate 14. Since the D-Type Flip-Flop 13 has been cleared by the reset pulse the $\overline{Q}$ output pin will be a logic one and is connected to input pin of NAND gate 14. The result of these two high inputs that appear on NAND gate 14 will cause its output pin to be a logic zero. The output pin of delay line 12 is connected to the input pin of the 50 nano second ten tap delay line 11. The total delay of the two delay lines 11 and 12 in series is 75 nano seconds with each tap being delayed 5 nano seconds from the preceding tap. Delay line 11 output pins are connected to the D inputs of the D-Type Data Latch 10. The delay line outputs that are connected to the D inputs of Data Latch 10 are equivalent to the 35 nano seconds through 70 nano seconds delays in 5 nano second increments of delay lines 11 and 12. The RD will propagate through the two delay lines 11 and 12, and when the RD returns to a logic zero at the end of its bit time the output pin of NAND gate 14 will change from a logic zero to a logic one clocking the D-Type Data Latch 10, latching the state of the delay line 11 at that time.

If the pulse width is less than 35 nano seconds, it will not have propagated through delay line 12 to the T2 output of delay line 11 and data latch 10 will latch all zeros. Since it is the $\overline{Q}$ outputs of data latch 10 that are connected to the inputs of Priority Encoder 9 all the inputs of item 9 will be high.

If the RD pulse width is greater than 65 nano seconds all the D inputs of data latch 10 will be high when the RD changes from a high to a low latching all highs into data latch 10 causing all the inputs of Encoder 9 to be low.

If the pulse width is within the maximum bias distortion limits the signal will have propagated to somewhere between the T2 output and the T8 output of delay line 11. Since the Priority Encoder 9 responds only to the highest number priority the A0–A2 outputs will reflect the highest input number with a zero. More precisely the width of the RD bit can be determined by how far this signal has propagated through the delay lines when its trailing edge occurred.

The output pin of the NAND gate 14 will also clock the D-Type Flip-Flop 13; since the D input pin is high, the $\overline{Q}$ output pin will change to a logic zero. This $\overline{Q}$ output is connected to input pin of NAND gate 14 and this zero will cause the output pin of the NAND gate 14 to remain high thereby disabling the NAND gate from producing any additional clocks. The $\overline{Q}$ output pin of flip-flop 13 is also connected to the E1 input pin of Encoder 9, and when the E1 input pin of the Priority Encoder 9 changes to a logic zero, this will enable the outputs of the Priority Encoder 9.

Thus, the inputs of the Priority Encoder are connected to the $\overline{Q}$ outputs of the D-Type Data Latch 10 and if the RD is within the minimum and maximum pulse width the output pin 19 of ROM 3 will change to a logic one causing the output pin of the AND gate 7 to be a logic one. The output pin of AND gate 7 is connected to the input pin of AND gate 5 and this high will enable AND gate 5. The next low to high transition of the RD will cause the output pin of AND gate 5 to become logic one responding to the RD at its input pin. The output pin of AND gate 5 is connected to the clock input pin 13 of the D-Type Data Latch 2 and this low to high transition will latch the state of the outputs of delay line 1 into the D-Type Data Latch 2, to identify where each delayed clock is with respect to the RD leading edge.

This high on the output pin of AND gate 5 is also connected to the input of invertor 6 and will cause the invertor output pin to go low. This output pin of invertor 6 is connected to the clear input pin of the D-Type Flip-Flop 8 and a zero on this clear input pin will cause the flip-flip to clear. The Q output pin of flip-flop 8 will go low causing the output pin of AND gate 7 to go low, removing the high from the input pin of AND gate 5 disabling AND gate 5 and inhibiting any additional clocking of the D-Type Latch 2. The Q outputs of Latch 2 are connected to address inputs of ROM 3 together with the address inputs from the Priority Encoder 9. ROM 3 output pins 12, 16, 17 and 18 are the address inputs of Data Selector Multiplexer 4. The ten delayed clocks from the outputs of delay line 1 are connected to the data inputs of multiplexer 4. ROM 3 has been programmed to compensate for circuit component propagation delays, knowing the data pulse width and where the leading edge of the data is with reference to the delayed clocks. ROM 3 outputs address the multiplexer 4 to select the delayed clock that corresponds to the center of the RD (received data). This output that appears at pin 12 of multiplexer 4 is the RD Sample Clock.

As stated in the theory above, the delayed clocks to the leading edge of RD will drift with respect to each other in time, and therefor an enable pulse of approximately 25 nano seconds must be sent to the clock input of the D-Type Flip-Flop 8 every word frame depending on signal conditions and data accuracy requirements. (A word frame is equal to eight to fifty one data bits). This enable clock will set the D-Type flip-flop 8 allowing the Q output to change to a logic one and as stated above this will cause the output of AND gate 7 to change to a logic one enabling AND gate 5 to clock the D-Type Latch 2 with the new RD to delayed clocks relationship with the next start bit.

If the RD returns to a logic zero prematurely, (in less than 35 nano seconds), the output pin of NAND gate 14 will clock the D-Type Data Latch 10 before the signal propagates to the T2 output of delay line 11 which would require 35 nano seconds of time to elapse. All the Q̄ outputs of data latch 10 will be high causing the A0–A2 and the GS outputs of the Priority Encoder 9 to be high. With the GS output high and being connected to the input pin of AND gate 16, it will cause the output pin of the AND gate 16 to change to a logic one when the RD signal has propagated to the T9 output pin of delay line 11. The output pin of AND gate 16 is connected to the input pin of NOR gate 15 and a high on this input will cause the output pin of the NOR gate 15 to go low resetting the D-Type Flip-Flop 13.

If the signal on the RD line exceeds the maximum pulse width of 65 nano seconds it will propagate to the T9 output of delay line 11, which requires a minimum of 70 nano seconds before a high to low transition of the RD occurs. The GS output pin of Encoder 9 is high and is connected to input pin of AND gate 16. The signal at the T9 output pin of delay line 11 is connected to the input pin of AND gate 16. With both inputs high the output pin of the AND gate 16 will be high. The output pin of AND gate 16 is connected to input pin of NOR gate 15 and this high on NOR gate 15 input will cause its output pin to be low. This output pin of NOR gate 15 is connected to the clear input pin of flip-flop 13 and this low on the clear input will clear D-Type flip-flop 13. With the clear input of the D-Type Flip-Flop 13 low it will not respond to clocks from NAND gate 14 when the RD signal does go low. With the D-Type Flip-Flop 13 in the cleared or reset state the circuit logic will continue searching for valid RD.

The multitapped delay line of the present invention provides a plurality of clock positions from the one input clock. The UART spike detection circuit divides the 16× clock from the start of the RD to sample the center of the RD. The present invention utilizes a leading edge of the RD-to-clock position circuit, a bias distortion circuit and a means for combining and decoding the output signals of these circuits to determine the center of the RD so as to select the proper sampling clock for the RD.

While the invention has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A received data sampling clock circuit for use in asynchronous local area networks, comprising a RD (received data)-to-clock position circuit for determining the position of RD with respect to a system clock; a bias distortion circuit for determining the pulse width of the RD; and means for combining and decoding output signals from said RD-to-clock position circuit and said bias distortion circuit for determining an approximate center of said RD and for selecting a proper sampling clock for said RD.

2. The received data sampling clock circuit of claim 1, said RD-to-clock position circuit comprising a multitapped delay line, an input of said delay line being a system clock; and means for latching delay line outputs from said multitapped delay line, said latching means including a first D-Type Data Latch and utilizing a leading edge of the RD input signal to determine a delayed clocks-to-RD phase relationship.

3. The received data sampling clock circuit of claim 2, said means for combining and decoding output signals and selecting a proper sampling clock comprising at least a ROM having at least one input connected to said bias distortion circuit and at least one input connected to said RD-to-clock position circuit and at least one output connected to at least one input of a data selector multiplexer, said data selector multiplexer having at least one input connected to said RD-to-clock position circuit and an output of said data selector multiplexer being said sampling clock.

4. The received data sampling clock circuit of claim 3, in which said delay line outputs of said multitapped delay line are connected to data inputs of said data selector multiplexer to provide a plurality of clock positions.

5. The received data sampling clock circuit of claim 4, in which said delay line outputs of said multitapped delay line are also connected to D inputs of said first D-Type Data Latch so as to allow the phase of said delay line outputs to be latched into said first D-Type Data Latch by the leading edge of the RD input signal.

6. The received data sampling clock circuit of claim 3, in which the outputs of the delay line are connected to the data inputs of said data selector multiplexer.

7. The received data sampling clock circuit of claim 3, said means for latching said delay line outputs comprising two AND gates and a D-Type flip-flop, a first AND gate having at least one input connected to an output of said D-Type flip-flop and the other input connected to one of said ROM outputs and being used to enable a second AND gate, and said second AND gate having one input connected to the RD input signal and another input connected to an output of said first AND gate and said second AND gate having an output connected to a clock input of said first D-Type Data Latch for latching said delay line outputs into said first D-Type Data Latch.

8. The received data sampling clock circuit of claim 7, said one of said ROM outputs being high only if bias distortion of said RD input signal is within a predetermined range.

9. The received data sampling clock circuit of claim 7, in which the first D-Type Data Latch outputs are connected to address inputs of the ROM.

10. The received data sampling clock circuit of claim 7, in which the outputs of said ROM are connected to the address inputs of the data selector multiplexer.

11. The received data sampling clock circuit of claim 1, said bias distortion circuit comprising a delay line, an input of which is the RD input signal; a second D-Type Data Latch for latching at least one output of said delay line; means for latching the delay line outputs into said second D-Type Data Latch with a trailing edge of the RD input signal for determining the position of the RD; and a Priority Encoder responsive to the latched delay line outputs to determine RD bias distortion.

12. The received data sampling clock circuit of claim 11, the latching means further comprising an AND gate having one input connected to an output of said Priority Encoder and another input connected to an output of said delay line, a NOR gate having one input connected to an output of said AND gate and another input connected to a reset signal, a D-Type flip-flop having an enable input connected to an output of said NOR gate, and a NAND gate having one input connected to an output of said D-Type flip-flop, another input connected to said RD input signal and an output connected to said second D-Type Data Latch.

13. The received data sampling clock circuit of claim 12, in which a high to low transition caused by the trailing edge of the RD input signal results in a low to high transition on the output of the NAND gate; said low to high transition at the NAND gate output latching the outputs of the delay line into said second D-Type Data Latch.

14. The received data sampling clock circuit of claim 13, in which the outputs of said second D-Type Data Latch are connected to priority inputs of said Priority Encoder.

15. The received data sampling clock circuit of claim 14, in which the outputs of the Priority Encoder are connected to address inputs of the ROM.

16. The received data sampling clock circuit of claim 15, in which the latched information of the leading edge of the RD input signal and the bias distortion circuit outputs are combined and decoded as address inputs of a ROM that has been programmed to compensate for component internal delays to define a delayed clock.

17. The received data sampling clock circuit of claim 16, in which said ROM outputs are connected to the address inputs of said data selector multiplexer.

18. The received data sampling clock circuit of claim 17, in which the delayed clock selected by the ROM address inputs to the data selector multiplexer is the sampling clock for the RD input signal and appears at the center of the RD input signal.

19. A method for receiving and retiming asynchronous data, comprising:
 transferring received data to an RD-to-clock position circuit to determine a delayed clock-to-RD phase relationship;
 compensating for bias distortion associated with said received data by providing a bias distortion circuit; and
 combining and decoding outputs from said RD-to-clock position circuit and said bias distortion circuit to determine a true center of said received data and to select a proper sampling clock for said received data.

* * * * *